(12) United States Patent
DeSousa et al.

(10) Patent No.: US 12,466,973 B2
(45) Date of Patent: Nov. 11, 2025

(54) PACKAGING COATING CONTAINING WATER-DISPERSIBLE ACRYLIC BLOCK COPOLYMER

(71) Applicant: SWIMC LLC, Cleveland, OH (US)

(72) Inventors: Joseph D. DeSousa, Pittsburgh, PA (US); Zhilian Zhou, Sewickley, PA (US); Kailas B. Sawant, Mars, PA (US)

(73) Assignee: SWIMC LLC, Cleveland, OH (US)

( * ) Notice: Subject to any disclaimer, the term of this patent is extended or adjusted under 35 U.S.C. 154(b) by 1195 days.

(21) Appl. No.: 15/734,770

(22) PCT Filed: Jun. 11, 2019

(86) PCT No.: PCT/US2019/036494
§ 371 (c)(1),
(2) Date: Dec. 3, 2020

(87) PCT Pub. No.: WO2019/241209
PCT Pub. Date: Dec. 19, 2019

(65) Prior Publication Data
US 2021/0230443 A1 Jul. 29, 2021

Related U.S. Application Data

(60) Provisional application No. 62/683,361, filed on Jun. 11, 2018.

(51) Int. Cl.
*B32B 15/082* (2006.01)
*B32B 27/30* (2006.01)
(Continued)

(52) U.S. Cl.
CPC .......... *C09D 153/00* (2013.01); *B32B 15/082* (2013.01); *B32B 27/308* (2013.01);
(Continued)

(58) Field of Classification Search
CPC ...... C09D 5/086; C09D 133/08; B65D 23/02; B32B 2439/66; B32B 2439/70;
(Continued)

(56) References Cited

U.S. PATENT DOCUMENTS 4,098,745 A * 7/1978 Borman ............ B65D 7/42
524/510
4,151,143 A * 4/1979 Blank ............ C08F 265/04
524/533
(Continued)

FOREIGN PATENT DOCUMENTS

CN 1075735 A 9/1993
CN 1319632 A 10/2001
(Continued)

OTHER PUBLICATIONS

Thesis, Chapter 8-9, "Literature Review Epoxy Toughening," 1998, pp. 154-169.
(Continued)

*Primary Examiner* — Michael C Romanowski
(74) *Attorney, Agent, or Firm* — Mueting Raasch Group

(57) ABSTRACT

A food or beverage container having a body portion or an end portion that includes a metal substrate with a coating composition disposed thereon. The coating composition includes a water-dispersible acrylic linear block copolymer made by surfactant-free heterogeneous radical polymerization ("SFHRP"). The block copolymer imparts a desirable combination of flexibility and corrosion resistance to the coating composition, and the substantial absence of surfactants during polymerization contributes to other desirable properties including good blush resistance.

20 Claims, 3 Drawing Sheets

(51) Int. Cl.
  *B65D 6/28*        (2006.01)
  *B65D 17/00*       (2006.01)
  *B65D 17/28*       (2006.01)
  *B65D 23/02*       (2006.01)
  *B65D 25/14*       (2006.01)
  *C09D 133/08*      (2006.01)
  *C09D 153/00*      (2006.01)
  *C09D 5/08*        (2006.01)

(52) U.S. Cl.
  CPC .............. *B65D 7/34* (2013.01); *B65D 17/02* (2013.01); *B65D 17/4012* (2018.01); *B65D 23/02* (2013.01); *B65D 25/14* (2013.01); *C09D 133/08* (2013.01); *B32B 2439/66* (2013.01); *B32B 2439/70* (2013.01); *C09D 5/086* (2013.01)

(58) Field of Classification Search
  CPC ..... B32B 27/30; B32B 27/308; B32B 15/082; B32B 15/20; C08L 33/08; C08L 33/10; C08F 220/1804
  USPC ............................................ 428/34.1–36.92
  See application file for complete search history.

(56) References Cited

U.S. PATENT DOCUMENTS

| | | | |
|---|---|---|---|
| 5,714,539 A * | 2/1998 | Perez | C08L 51/04 525/902 |
| D406,236 S | 3/1999 | Brifcani et al. | |
| 6,395,836 B1 * | 5/2002 | Shinoda | C08F 265/06 524/561 |
| 6,503,975 B1 | 1/2003 | Huybrechts | |
| 8,334,329 B2 | 12/2012 | Doumaux et al. | |
| 8,927,075 B2 | 1/2015 | Gibanel et al. | |
| 9,029,470 B2 | 5/2015 | Rademacher et al. | |
| 9,255,211 B2 | 2/2016 | Schellekens et al. | |
| 9,404,006 B2 | 8/2016 | Li | |
| 9,958,797 B1 | 5/2018 | Lu et al. | |
| 9,958,798 B2 | 5/2018 | Lu et al. | |
| 9,981,776 B2 | 5/2018 | Gibanel et al. | |
| 11,174,409 B2 * | 11/2021 | Katzenstein | C09D 5/027 |
| 2002/0198316 A1 * | 12/2002 | Adam | C08F 8/00 524/832 |
| 2006/0100366 A1 * | 5/2006 | O'Brien | C08F 283/006 524/800 |
| 2007/0155907 A1 * | 7/2007 | Zhao | C08F 293/005 525/242 |
| 2008/0262160 A1 * | 10/2008 | Du Prez | C08F 220/26 525/228 |
| 2008/0269411 A1 * | 10/2008 | Sarkar | C09D 133/26 524/879 |
| 2009/0143528 A1 * | 6/2009 | Mestach | C08F 265/02 427/508 |
| 2010/0048750 A1 * | 2/2010 | Blom | C09D 133/08 521/142 |
| 2010/0075084 A1 * | 3/2010 | O'Brien | C08F 220/16 428/35.8 |
| 2010/0136353 A1 * | 6/2010 | Schellekens | C09D 153/005 524/505 |
| 2010/0256299 A1 * | 10/2010 | Nabuurs | C08F 293/005 524/832 |
| 2011/0021689 A1 * | 1/2011 | Schellekens | C08L 53/00 524/505 |
| 2011/0159306 A1 * | 6/2011 | Schellekens | C09D 153/00 524/460 |
| 2012/0077030 A1 * | 3/2012 | Gerst | C08F 265/02 524/460 |
| 2012/0157577 A1 * | 6/2012 | Roller | C09D 141/00 524/460 |
| 2013/0059964 A1 * | 3/2013 | Knischka | C09D 7/45 524/505 |
| 2013/0064938 A1 * | 3/2013 | O'Brien | B65D 17/00 427/236 |
| 2013/0105473 A1 * | 5/2013 | Beaudry | B65D 25/34 220/1.5 |
| 2013/0172483 A1 * | 7/2013 | Roller | C08L 33/14 524/809 |
| 2013/0280454 A1 * | 10/2013 | Telford | C09D 151/00 524/158 |
| 2013/0281574 A1 * | 10/2013 | Li | C08F 2/001 523/453 |
| 2014/0343192 A1 | 11/2014 | Cochran et al. | |
| 2015/0218407 A1 * | 8/2015 | Bao | C09D 125/14 427/388.2 |
| 2015/0267062 A1 * | 9/2015 | Beaudry | B05D 7/14 428/35.9 |
| 2015/0353759 A1 * | 12/2015 | Xin | C09D 125/14 524/521 |
| 2016/0376446 A1 * | 12/2016 | Gibanel | B65D 25/14 428/35.8 |
| 2017/0002227 A1 * | 1/2017 | Gibanel | C09D 125/08 |
| 2017/0362425 A1 * | 12/2017 | Siddiqui | C09D 133/04 |
| 2017/0369603 A1 | 12/2017 | Gibanel et al. | |
| 2018/0265729 A1 | 9/2018 | Gibanel et al. | |
| 2020/0347171 A1 * | 11/2020 | Okkel | G03F 7/033 |

FOREIGN PATENT DOCUMENTS

| | | | | |
|---|---|---|---|---|
| CN | 101528870 A | 9/2009 | | |
| CN | 102046665 A | 5/2011 | | |
| CN | 112384581 A | 6/2019 | | |
| EP | 1138730 A2 | 10/2001 | | |
| EP | 3016868 A1 | 5/2016 | | |
| EP | 3237557 A1 | 11/2017 | | |
| EP | 2970548 B1 | 12/2017 | | |
| EP | 3455309 A1 | 3/2019 | | |
| WO | WO-0177198 A1 * | 10/2001 | .......... C08F 293/005 | |
| WO | WO 2012/089747 A1 | 7/2012 | | |
| WO | WO 2015/002958 A1 | 1/2015 | | |
| WO | WO 2015/002961 A1 | 1/2015 | | |
| WO | WO 2016/044378 A1 | 3/2016 | | |
| WO | WO 2016/105504 A1 | 6/2016 | | |
| WO | WO-2017180895 A1 * | 10/2017 | ............. B65D 25/14 | |
| WO | WO 2017/194464 A1 | 11/2017 | | |
| WO | WO 2019/046700 A1 | 3/2019 | | |
| WO | WO 2019/241209 A1 | 12/2019 | | |

OTHER PUBLICATIONS

"Thermal Transitions of Homopolymers: Glass Transition & Melting Point," Sigma Aldrich, 2013, 2 pages.

Staphyloid, "Reforming agents for powder coatings," GANZ Chemical Co., Ltd., 1 page.

NANOSTRENGTH® Epoxy: Functional Additives, Arkema, 2008, 2 pages.

Lu et al., "One-Step Synthesis of Amphiphilic Ultrahigh Molecular Weight Block Copolymers by Surfactant-Free Heterogeneous Radical Polymerization," ACS Macro Letters, 2015, 4(12): 1317-20.

"KR-693 Rubber modified epoxy resin," KUKDO, Dec. 2004, 1 page.

Jansen et al., "Preparation of Thermoset Rubbery Epoxy Particles as Novel Toughening Modifiers for Glassy Epoxy Resins," Polmer 1999, 40:5601-5607.

Polymer Properties Database, "Glass Transition Temperature," 2015, 10 pages.

ALDRICH Material Sciences, "Controlled Radical Polymerization Guide," 2012, 52 pages.

Schellekens et al., "Block copolymers for waterborne coatings—A novel eco-friendly approach for improved coating adhesion to untreated polypropylene based plastics," Progress in Organic Coatings, 2011, 72(1-2): 137-143.

Barsotti et al., "Nanostrength® Block Copolymers for Epoxy Toughening," Meeting of the Thermoset Resit Formulators Association in Chicago, Sep. 15, 2008, 9 pages.

Arslan, "Block and Graft Copolymerization by Controlled/Living Radical Polymerization Methods," Chp. 13 INTECH, 2012, 42 pages.

(56) References Cited

OTHER PUBLICATIONS

PCT/US2019/036494, International Search Report and Written Opinion dated Sep. 22, 2019, 11 pages.

\* cited by examiner

PACKAGING COATING CONTAINING WATER-DISPERSIBLE ACRYLIC BLOCK COPOLYMER

CROSS REFERENCE TO RELATED APPLICATIONS

This application is a national stage filing under 35 U.S.C. § 371 of International Application No. PCT/US2019/036494 filed 11 Jun. 2019 and entitled "PACKAGING COATING CONTAINING WATER-DISPERSIBLE ACRYLIC BLOCK COPOLYMER", which claims the benefit of U.S. Provisional Application No. 62/683,361 filed 11 Jun. 2018 and entitled "PACKAGING COATING CONTAINING WATER-DISPERSIBLE ACRYLIC BLOCK COPOLYMER", the disclosures of both of which are incorporated herein by reference in their entirety.

FIELD

This disclosure concerns coating compositions that may be used to form coatings (e.g., spray coatings) for food and beverage containers, and for other packaging articles.

BACKGROUND

A wide variety of coating compositions have been used to coat the surfaces of food and beverage cans and other packaging articles. For example, metal cans are sometimes coated using "coil coating" or "sheet coating" operations in which a planar coil or sheet of a suitable substrate (e.g., steel or aluminum metal) is coated with a suitable composition and then cured or otherwise hardened. The coated substrate then is formed into the can end or body. Alternatively, liquid coating compositions may be applied by a variety of measures including spraying, dipping, rolling, etc. to the formed article and then cured or otherwise hardened.

Packaging coatings should preferably be capable of high-speed application to the substrate and provide the necessary properties when hardened to perform in this demanding end use. For example, the coating should be safe for food contact, have excellent adhesion to the substrate, have sufficient flexibility to withstand deflection of the underlying substrate without rupturing (e.g., during fabrication steps or due to damage occurring during transport or use of the packaging article), and resist degradation over long periods of time, even when exposed to harsh environments. Coatings that will be subjected to post-curing deformation, such as the coatings applied to can or end preforms that will be subsequently cured and formed into a final shape, require particularly good flexibility so that the applied coating remains intact on the substrate after deformation.

Acrylic copolymers have been used to make packaging coatings. It has however been difficult to prepare acrylic copolymers having an adequate balance of properties, such as an adequate balance of flexibility and corrosion resistance. For acrylic copolymers, flexibility and corrosion resistance tend to move in opposite directions with changes in copolymer composition. This is a particular problem for coatings applied to metallic packaging substrates that are subjected to post-application forming or reforming operations, such as draw and redraw containers, container ends, and in particular the deformed coated interior area near the rivet of a "pop-top" can end.

From the foregoing, it will be appreciated that what is needed in the art is a packaging container (e.g., a food or beverage can or a portion thereof) that is coated with an acrylic copolymer composition having an adequate balance of properties including flexibility and corrosion resistance.

SUMMARY

The present invention provides in one aspect a food or beverage container that includes one or more of a body portion or an end portion including a metal substrate and a coating composition disposed thereon, wherein the coating composition includes a water-dispersible acrylic linear block copolymer made by surfactant-free heterogeneous radical polymerization ("SFHRP").

The invention provides in another aspect a method for preparing a coated food or beverage container, or a portion thereof. The method includes applying a coating composition that includes a water-dispersible acrylic linear block copolymer made by SFHRP to a metal substrate prior to or after forming the metal substrate into a food or beverage container or portion thereof. In certain embodiments, applying the composition to such metal substrate includes applying the composition to a metal substrate in the form of a planar coil or sheet, hardening the acrylic block copolymer, and forming the substrate into a food or beverage can or portions thereof. In other embodiments, applying the composition to such metal substrate comprises applying the composition to the metal substrate after the metal substrate has been formed into a can or portion thereof.

In certain embodiments, the above-mentioned copolymer has an A-B diblock structure in which the A block is primarily and preferably entirely derived from a water-soluble monomer, the B block is primarily and preferably entirely derived from a less water-soluble or water-insoluble monomer, and the A block has a different Tg (e.g., a lower Tg, and more often a higher Tg) than the B block. In other embodiments, the above-mentioned copolymer has a B-A-B triblock structure in which the A block is primarily and preferably entirely derived from a water-soluble monomer, the B blocks are primarily and preferably entirely derived from a less water-soluble or water-insoluble monomer, and the A block has a different Tg than the B blocks. In certain embodiments, the A block and B block(s) differ in Tg by at least about 20, at least about 50, at least about 75 or at least about 100° C. In certain embodiments, the copolymer contains about 25 to about 75 mole percent of the A block and about 75 to about 25 mole percent of the B block(s).

The disclosed block copolymers provide coating compositions having a desirable combination of flexibility and corrosion resistance. Their substantial absence of surfactants during polymerization contributes to other desirable properties including good blush resistance.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWING

Like reference symbols in the various figures of the drawing indicate like elements. The elements in the drawing are not to scale.

Definitions

Figure 1:
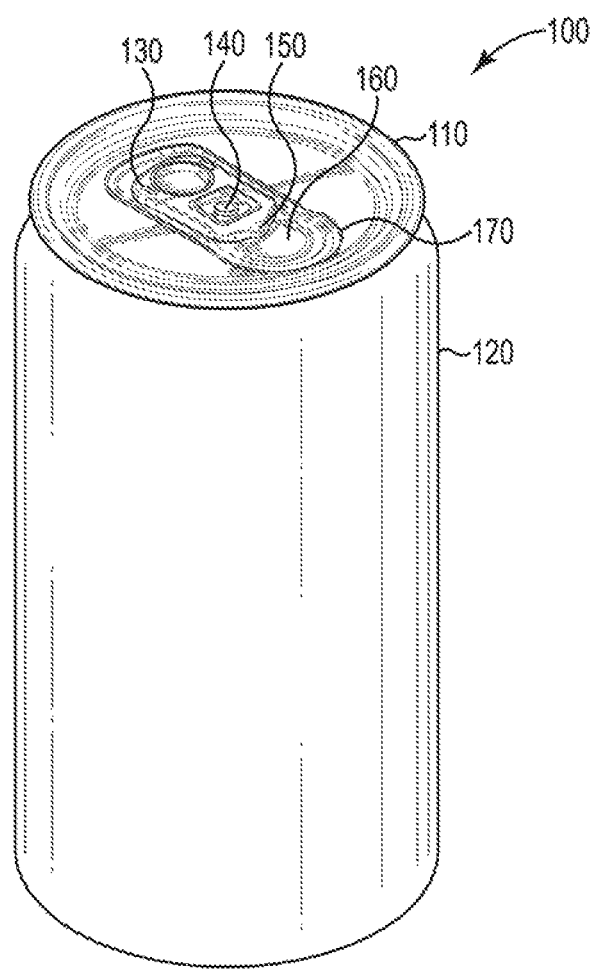
FIG. 1 is a perspective view of a coated container.

Unless otherwise specified, the following terms have the meanings provided below.

The terms "a," "an," "the," "at least one," and "one or more" are used interchangeably. Thus, for example, a coating composition that comprises "a" copolymer means that the coating composition includes "one or more" copolymers.

The terms "acrylic block" and "acrylic polymer" refer to a block or polymer made of a polymerized product of one or more monomers having a (meth)acryloyl group of the formula $H_2C=CR-(CO)-$ where R is hydrogen or methyl, with the term (meth)acryloyl referring to an acryloyl group, a methacryloyl group, or both. Suitable such monomers include, for example, (meth)acrylic acid, (meth)acrylate, (meth) acrylamide, N-alkyl (meth) acrylamide, N-dialkyl (meth) acrylamide, N-trialkyl (meth) acrylamide, and hydroxy-substituted alkyl (meth)acrylate, with the term "(meth)acrylic acid" referring to one or both of acrylic acid and methacrylic acid, and the term "(meth)acrylamide" referring to one or both of acrylamide and methacrylamide. Acrylic polymers can also contain polymerized or partially polymerized forms of one or more chemical crosslinkers. The disclosed acrylic polymers preferably contain only incidental or trace amounts of other materials, such as impurities.

The term "acrylic block copolymer" refers to a block copolymer wherein each polymeric block is an acrylic block. A numerical prefix may be used to identify the number of blocks, thus "acrylic diblock copolymers" and "acrylic triblock copolymers" have two and three acrylic blocks, respectively.

The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "aryl group" means a cyclic hydrocarbon group having a closed aromatic ring or ring system including, for example, a phenylene, naphthylene, biphenylene, fluorenylene or indenyl ring system, as well as heteroarylene groups (viz., a closed ring hydrocarbon in which one or more of the atoms in the ring is an element other than carbon (e.g., nitrogen, oxygen, sulfur, etc.)). Aryl groups can have any suitable number of carbon atoms. Some aryl groups are $C_6$ or higher, $C_{10}$ or higher, or $C_{14}$ or higher. Some aryl groups are $C_{16}$ or smaller, $C_{14}$ or smaller, or $C_{10}$ or smaller. Phenyl is a common aryl group. Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.).

The term "bisphenol" refers to a polyhydric polyphenol having two phenylene groups that each include six-carbon rings and a hydroxyl group attached to a carbon atom of the ring, wherein the rings of the two phenylene groups do not share any atoms in common.

The term "comprises" and variations thereof do not have a limiting meaning where these terms appear in the description and claims.

The term "copolymer" refers to a polymer having more than one type of repeating unit. The term "block copolymer" refers to a linear copolymer having a plurality of segments known as polymeric "blocks". Each block includes multiple (e.g., at least 5, at least 8 or at least 10) units derived from or derivable from a monomer, and different blocks contain units derived from or derivable from different monomers. The boundary between adjacent blocks can be sharp, wherein the composition of the monomeric units changes abruptly, or tapered, wherein there is a mixed region between the blocks containing monomeric units from both of the adjacent blocks. The term "block copolymer" may be written with standard numerical prefixes to indicate the number of blocks. Thus, "diblock copolymer" and "triblock copolymer" are block copolymers with two and three blocks, respectively. Star copolymers, graft copolymers, comb copolymers, dendrimers, and other macromolecules with substantially non-linear architectures are not block copolymers (viz., linear block copolymers) as that term is used herein, and notwithstanding the potential presence in such non-linear macromolecules of blocky segments in portions of the macromolecule.

The terms "crosslinker" or "chemical crosslinker" refer to a chemical compound that has multiple reactive sites for forming covalent bonds with one or more existing or growing polymer chains, viz., between polymer chains or between two different regions of the same polymer chain. Chemical crosslinkers typically have two, three, or more ethylenically unsaturated groups. Monomers such as (meth) acrylates that have only one ethylenically unsaturated group will not be deemed to be crosslinkers or chemical crosslinkers, even though such monomers can participate in the formation of crosslinked polymers by way of, for example, chain transfer reactions.

The term "Da" is an abbreviation for "Dalton" or its plural, "Daltons" and is an accepted unit of molecular weight. The abbreviation Da may be modified by typical prefixes indicating orders of magnitude, for example, kDa is an abbreviation for kiloDaltons.

The term "food-contact surface" refers to a surface of an article (e.g., a food or beverage container) that is in contact with, or suitable for contact with, a food or beverage product.

The terms "group" and "moiety" are used to differentiate between chemical species that allow for substitution or that may be substituted and those that do not allow or may not be so substituted. Substitution on the organic groups of compounds used in the present invention is contemplated. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether, haloalkyl, nitroalkyl, carboxyalkyl, hydroxyalkyl, sulfoalkyl and like groups. On the other hand, the phrase "alkyl moiety" is limited to the inclusion of only pure open chain saturated hydrocarbon alkyl substituents, such as methyl, ethyl, propyl, t-butyl, and the like. Accordingly as used herein, the term "group" is intended to be a recitation of both the particular moiety, as well as a recitation of the broader class of substituted and unsubstituted structures that includes the moiety.

The term "homopolymer" refers to a polymer or a block of a block copolymer that is composed substantially of a single polymerized monomer. As used in this context, being composed substantially of a single polymerized monomer means that no more than incidental or trace amounts of other monomers, such as impurities, can be present.

The term "independently" when used in reference to a group, moiety or other element means that such that each instance of such element may be the same or different. For example, if element E appears in two instances and can be independently X or Y, then the first and second instances of element E can be, respectively, X and X, X and Y, Y and X, or Y and Y.

The term "latex polymer" refers to a dispersion or emulsion of polymer particles formed in the presence of water and one or more secondary dispersing or emulsifying agents whose presence is required to form the dispersion or emulsion. The secondary dispersing or emulsifying agent is normally separate from the polymer after polymer formation.

The term "mobile" when used with respect to a compound means that the compound can be extracted from a cured composition when the cured composition (typically at a coating weight of about 1 mg/cm$^2$) is exposed to a test medium for some defined set of conditions, depending on the end use. An example of these testing conditions is exposure of the cured coating to HPLC-grade acetonitrile for 24 hours at 25° C.

The term "multi-coat coating system" refers to a coating system that includes at least two layers. In contrast, a "mono-coat coating system" as used herein refers to a coating system that includes only a single layer.

The term "on" when used in the context of a coating applied on a surface or substrate, includes both coatings applied directly and coatings applied indirectly to the surface or substrate. Thus, for example, a coating applied to an undercoat layer overlying a substrate constitutes a coating applied on the substrate.

The prefix "poly" before the name of a monomer refers to a polymer or polymer block that is predominantly made up of a polymerized version of the specified monomer. In this context, the term "predominantly made up of" means that at least 80%, at least 85%, at least 90%, at least 95%, or at least 99% of the repeat units in the polymer or polymer block are polymerized versions of the specified monomer. The remainder of the polymer or polymer block can include polymerized versions of monomers other than the specified monomer.

The term "polymer" includes both homopolymers and copolymers (e.g., polymers of two or more different monomers).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

When used with respect to a coating composition or a hardened or cured coating, the term "substantially free" of a particular bound or mobile compound means that the composition or coating contains less than 1000 parts per million (ppm) of the recited compound. Similarly, the term "essentially free" of a particular bound or mobile compound means that the composition or coating contains less than 100 parts per million (ppm) of the recited compound; the term "essentially completely free" of a particular bound or mobile compound means that the composition or coating contains less than 5 parts per million (ppm) of the recited compound; and the term "completely free" of a particular bound or mobile compound means that the composition or coating contains less than 20 parts per billion (ppb) of the recited compound. If the aforementioned phrases are used without the term "mobile" (e.g., "substantially free of XYZ compound") then the disclosed compositions and coatings contain less than the aforementioned compound amounts whether the compound is mobile in the hardened or cured coating or bound to a constituent of the hardened or cured coating.

The terms "surfactant-free heterogeneous radical polymerization" and "SFHRP" refer to a controlled radical polymerization ("CRP") copolymer synthesis technique that utilizes an emulsion polymerization reaction that employs an aqueous phase and a non-aqueous phase, with a water-soluble monomer dissolved in the aqueous phase, a less water-soluble (e.g., a water-insoluble) monomer dispersed as phase-separated droplets in the nonaqueous phase, a substantial absence of oil-soluble initiators and controlled (viz., gradual) introduction of a water-soluble initiator into the aqueous phase. The block copolymer forms by initial growth of linear polymer chains derived from the water-soluble monomer, followed by termination of such chains at one or both ends by linear polymer chains derived from the less water-soluble or water-insoluble monomer.

The term "water-dispersing groups" refers to groups that aid dispersal or dissolution of a polymer bearing such groups into aqueous media. The term accordingly encompasses water-solubilizing groups.

A "water-dispersible" polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

The recitation of numerical ranges by endpoints includes all numbers subsumed within that range (e.g., 1 to 5 includes 1, 1.5, 2, 2.75, 3, 3.80, 4, 5, etc.).

DETAILED DESCRIPTION

Referring to FIG. 1, coated beverage container 100 is shown in perspective view. Container 100 includes beverage end 110 fastened (e.g., by crimping) to can 120. Pull tab 130 is fastened to end 110 by rivet 140. When pull tab 130 is lifted away from end 110, neck 150 on pull tab 130 depresses tear strip 160 into container 100, causing tear strip 160 to separate from end 110 along curved line of weakness 170 and form a partially circular opening in container 100.

Figure 2:
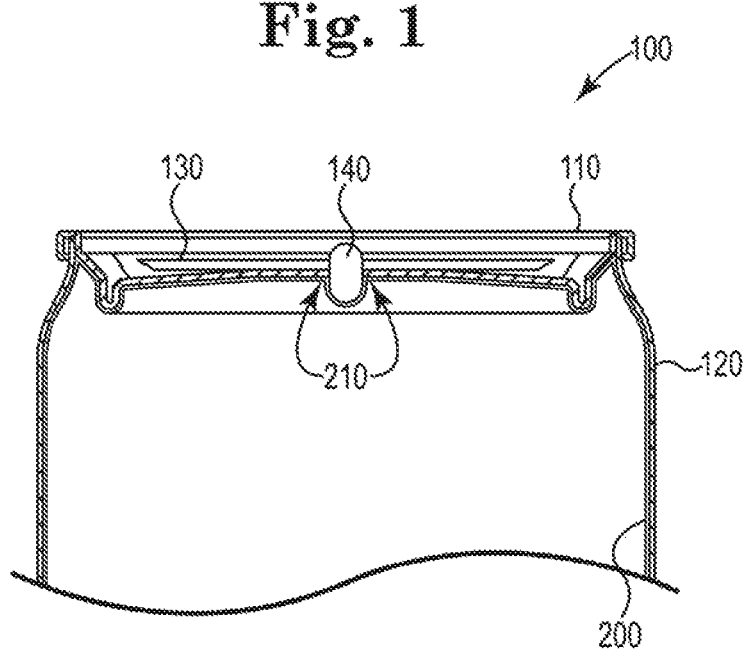
FIG. 2 is a partial cross-sectional view of the FIG. 2 coated container.

FIG. 2 shows the upper portion of container 100 in partial cross-section. Coating 200 was applied to the inner surface of end 110 and inner portion of rivet 140 after riveting tab 130 to end 110, and before attaching end 110 to can 120. Coating 200 was also applied to the inner wall and bottom of can 120 before attaching end 110 to can 120. The region 210 where coating 200 covers the intersection between end 110 and rivet 140 represents a particularly challenging portion of coating 200, and may be prone to blushing, adhesion failure, corrosion or other coating defects.

Figure 3:
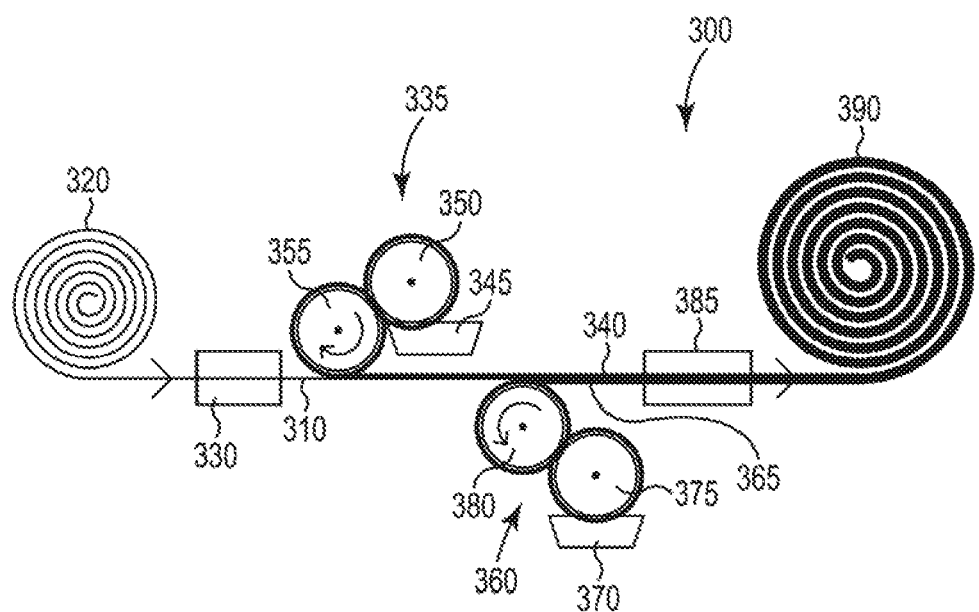
FIG. 3 is a schematic view of a coil coating line.

FIG. 3 shows a schematic view of coil coating line 300. Metal coil 310 passes from unwind roll 320 through cleaning station 330, beneath upper reverse roll coating apparatus 335 which dispenses a coating composition 340 from reservoir 345 onto pick up roll 350, coating roll 355 and the upper surface of coil 310. Coil 310 next passes over lower reverse roll coating apparatus 360 which dispenses a coating composition 365 from reservoir 370 onto pick up roll 375, coating roll 380 and the lower surface of coil 310. The coated coil passes through oven 385 and onto rewind roll 390. As discussed in more detail below, other coating techniques including sheet coating and part coating, and other coating application methods including spray coating, curtain coating and dip coating, may also or instead be employed.

Figure 4:
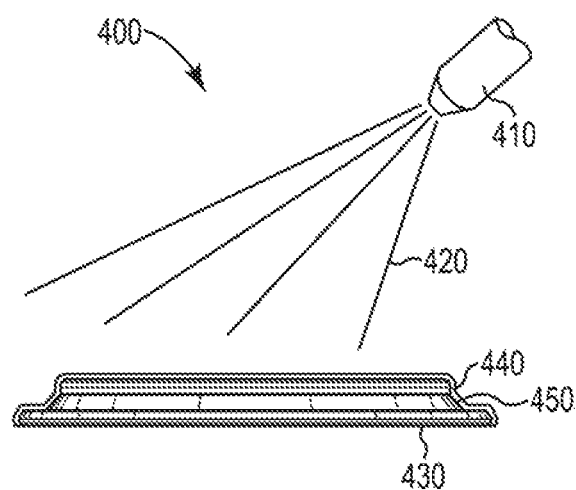
FIG. 4 is a side view of a beverage end spray coating system.

FIG. 4 shows a side view of spray coating system 400. Spray head 410 applies the disclosed coating composition as a spray 420 directed towards beverage can end 430, forming coating 440 on interior surface 450 of end 430.

Figure 5:
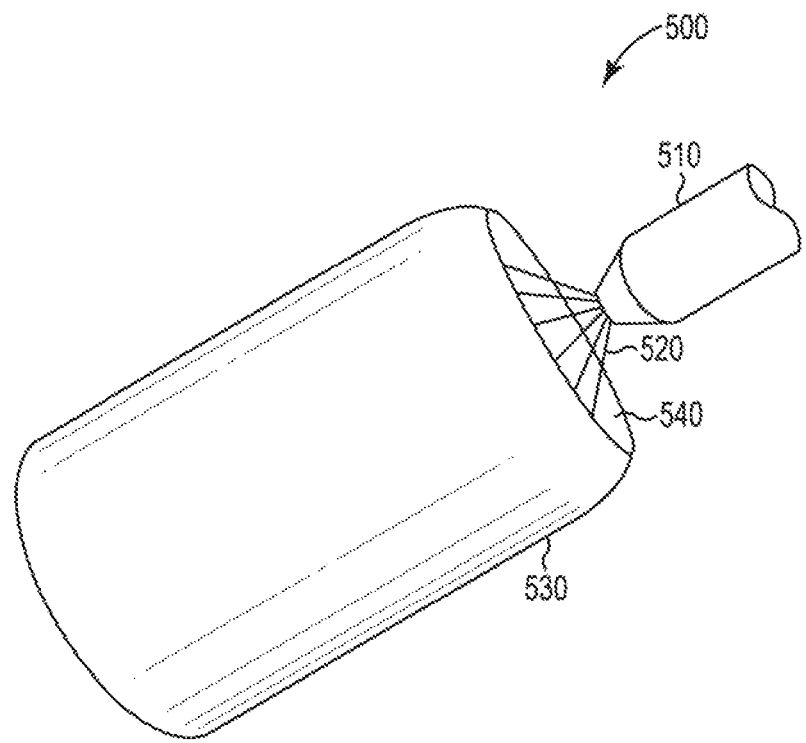
FIG. 5 is a perspective view of a can interior spray coating system.

FIG. 5 shows a perspective view of spray coating system 500. Spray head 510 applies the disclosed coating composition as a spray 520 directed into the interior of can 530, forming a coating on interior surface 540 of can 530.

The disclosed SFHRP procedure employs both a water-soluble monomer and a less water-soluble (e.g. water-insoluble) monomer. For brevity, the less water-soluble monomers will be referred to as "water-insoluble" monomers, it being understood that such monomers may exhibit some degree of water solubility so long as such solubility is sufficiently less than that of the chosen water-soluble monomer so as to enable suitable phase separation and block copolymerization of the chosen water-soluble and water-insoluble monomers via SFHRP.

A variety of water-soluble monomers may be employed to make the polymerized water-soluble monomer block (viz., the A block). The water-soluble monomer preferably includes at least one group (e.g., a carboxyl group) that remains after A block formation, imparts water solubility to the finished copolymer (optionally after reaction with a suitable neutralizing agent such as a volatile amine), and can serve as a crosslinking site in the final coating composition. The water-soluble monomer preferably reacts with itself rather than with the water-insoluble monomer so as to avoid random copolymerization. The growing A block desirably retains sufficient hydrophilic character and assumes sufficient oleophilic character to serve as a surfactant that can facilitate attachment to the A block of growing polymerized water-insoluble monomer block(s) (viz., the B block(s)). An A block having such surfactant characteristics can facilitate the copolymerization reaction without the need to add an additional surfactant (e.g., an oil-soluble surfactant) to the monomer reaction mixture. The A block typically will be formed from a single water-soluble monomer. If desired, mixtures of water-soluble monomers may be employed to make the A block. Comonomers that are not themselves water-soluble monomers but which can copolymerize with the selected water-soluble monomer(s) may be included in the reaction mixture and become a part of the A block. Preferably however at least 85 wt. %, at least 90 wt. %, at least 95 wt. % or 100 wt. % of the A block is derived from water-soluble monomers. Also, preferably at least 85 wt. %, at least 90 wt. %, at least 95 wt. % or 100 wt. % of the A block is derived from a single water-soluble monomer. Exemplary water-soluble monomers that may be employed and their respective homopolymer Tg include acrylic acid (105° C.), methacrylic acid (185° C.), acrylamide (165° C.) and methacrylamide (251° C.). Acrylic acid and methacrylic acid are preferred water-soluble monomers. Hydroxy-functional water-soluble monomers such as hydroxyethyl (meth)acrylate or other water-soluble or water-dispersible monomers such as ethoxylated (meth)acrylates may be employed in minor amounts, but preferably are avoided, as their presence may cause the cured coating to be unduly hygroscopic.

A variety of water-insoluble monomers may be employed to make the polymerized water-insoluble monomer block(s) (viz., the B block(s)). The water-insoluble monomer preferably reacts with itself rather than with the water-soluble monomer so as to avoid random copolymerization. The B block(s) typically will be formed from a single water-insoluble monomer. If desired, mixtures of water-insoluble monomers may be employed to make the B block(s). Comonomers that are not themselves water-insoluble monomers but which can copolymerize with the selected water-insoluble monomer(s) may be included in the reaction mixture used to form the B block(s). Preferably however at least 85 wt. %, at least 90 wt. %, at least 95 wt. % or 100 wt. % of the B block(s) are derived from water-insoluble monomers. Also, preferably at least 85 wt. %, at least 90 wt. %, at least 95 wt. % or 100 wt. % of the B block(s) are derived from a single water-soluble monomer. Exemplary water-insoluble monomers that may be employed and their respective homopolymer Tg values include methyl acrylate (10° C.), methyl methacrylate (105° C.), ethyl acrylate (−24° C.), ethyl methacrylate (66° C.), n-butyl acrylate (−54° C.), isobutyl acrylate (−24° C.), isobutyl methacrylate (53° C.), tert-butyl acrylate (38° C.), n-butyl methacrylate (20° C.), tert-butyl methacrylate (118° C.), glycidyl acrylate (−26° C.), glycidyl methacrylate (61° C.), cyclohexyl acrylate (19° C.), cyclohexyl methacrylate (92° C.), isobornyl acrylate (94° C.), isobornyl methacrylate (110° C.), benzyl methacrylate (54° C.), sec-butyl methacrylate (60° C.), isopropyl acrylate (−11° C.), isopropyl methacrylate (81° C.) and phenyl methacrylate (110° C.).

In some embodiments, the disclosed acrylic block copolymers contain blocks other than acrylic blocks, for example vinyl blocks, olefinic blocks, or vinyl ester blocks. In other embodiments, the disclosed acrylic block copolymers do not contain any blocks other than acrylic blocks. Exemplary monomers for forming vinyl blocks include styrene, methyl styrene, halostyrenes, isoprene, diallylphthalate, divinylbenzene, conjugated butadiene, alpha-methylstyrene, vinyl toluene, vinyl naphthalene and the like, as well as mixtures thereof. Styrene is a presently preferred vinyl monomer, in part due to its relatively low cost and high (100° C.) homopolymer Tg.

Exemplary monomers for forming olefinic blocks include ethyl acrylate, ethyl methacrylate, butyl acrylates, butyl methacrylates, styrene and the like, as well as mixtures thereof.

Exemplary monomers for forming vinyl ester blocks include vinyl acetate, vinyl propionate, vinyl butyrate, vinyl stearate, and the like, as well as mixtures thereof.

The disclosed acrylic block copolymers and disclosed coating compositions preferably are free or substantially free of mobile or bound bisphenol compounds (e.g., bisphenol A ("BPA"), bisphenol F ("BPF"), bisphenol S ("BPS")), aromatic glycidyl ethers of bisphenol compounds (e.g., the diglycidyl ether of BPA, BPF, or BPS) and polyvinyl chloride ("PVC") compounds.

A variety of water-soluble initiators may be employed to make the disclosed acrylic block copolymers via SFHRP. Exemplary such initiators and their CAS numbers and 10 hour half-life decomposition temperatures (in water unless otherwise indicated) include 2,2'-azobis [2-(2-imidazolin-2-yl) propane]dihydrochloride (CAS No. 27776-21-2, 44° C.), 2,2'-azobis(2-methylpropionamidine) dihydrochloride (CAS No. 2997-92-4, 56° C.), 2,2'-azobis [N-(2-carboxyethyl)-2-methylpropionamidine]tetrahydrate (CAS No. 1041483-94-6 (n-hydrate), 57° C.) and 2,2'-azobis [2-methyl-N-(2-hydroxyethyl) propionamide] (CAS No. 61551-69-7, 86° C.). These are respectively available as VA-044, V-50, VA-057 and VA-086 from Wako Specialty Chemicals, Inc.

The rate and nature of copolymerization will primarily depend upon the rate at which the water-soluble initiator is introduced into the aqueous phase. In general, SFHRP employs initiator starvation conditions via slow and continuous initiator addition. Suitable addition rates may be empirically determined taking into account reaction conditions including the temperatures, volume of reactants, mixing conditions and equipment employed. The temperature of polymerization is typically from 0 to 100° C., preferably from 50 to 100° C., and even more preferably from 65 to 100° C. The initiator introduction rate may for example be controlled to avoid exceeding such ranges, e.g., in order to maintain the reaction temperature below 100° C. The aqueous reaction medium is usually maintained at a pH of about 3 to about 9. The reaction time preferably is sufficient to enable completion of the reaction within one day and preferably within one 8 hour working shift. If desired, the reaction may be carried out using cosolvents other than water. Additional information regarding copolymer formation via SFHRP may be found for example in Lu et al., "One-Step Synthesis of Amphiphilic Ultrahigh Molecular Weight Block Copolymers by Surfactant-Free Heterogenous Radical Polymerization", ACS Macro Letters, 4, 1317-1320 (2015) and its accompanying Supporting Documents.

In certain embodiments, the completed copolymer will have a number average molecular weight (Mn), as measured using gel permeation chromatography and a polystyrene standard, of at least about 75,000, more preferably at least about 150,000, or even more preferably at least about 250,000 Da. The upper range for the copolymer Mn is not restricted and may be 1,000,000 Da or more. In certain embodiments, however, the Mn of the copolymer is less than about 1,000,000, or less than about 600,000 Da.

The A block and B block(s) in the finished copolymer will each have distinct Tg values. Block and copolymer Tg values may be measured, for example using dynamic mechanical analysis (DMA) and determining Tg based on tan delta peaks, or using differential scanning calorimetry (DSC) and determining Tg using thermal inflection points. Tg values for the individual blocks can also be estimated using the Fox equation:

$$1/Tg = W1/Tg1 + W2/Tg2 + \ldots WN/TgN$$

where 1, 2, . . . . N represent the individual monomers from which the block is made; W1, W2, . . . . WN add up to 1 and represent the weight fractions of each monomer from which the block is made; Tg1, Tg2, . . . . TGN represent the glass transition temperatures in degrees Kelvin for the homopolymers of each monomer from which the block is made; and Tg is the estimated block polymer glass transition temperature. In certain embodiments, the A block will have a lower Tg than the B block(s). In certain embodiments, the A block and B block Tg values will differ by at least about 20, at least about 50 or at least about 100° C. In some embodiments, the A block will have a Tg of at least about 100, at least about 150 or at least about 185° C. In some embodiments, the A block will have a Tg less than about 200, less than about 150 or less than about 110° C. In some embodiments, the B block(s) will have a Tg of at least about −54, at least about −24 or at least about 20° C. In some embodiments, the B block(s) will have a Tg less than about 50, less than about 20 or less than about 0° C.

The completed copolymer may be water-soluble or water-dispersible by itself, or may be water-soluble or water-dispersible after neutralization with a suitable compound that forms a salt (which can be a full salt or partial salt) soluble in or stably dispersible in the aqueous medium. Ordinarily when making the copolymer water-dispersible, the acid groups or other water-dispersing groups in the copolymer are at least 25% neutralized, preferably at least 30% neutralized, and more preferably at least 35% neutralized. Preferably, the copolymer includes a sufficient number of acidic, anhydride or other water-dispersing groups to form a stable aqueous dispersion upon neutralization with a base. The completed copolymer may for example have an acid number of at least 20, at least 40 or at least 80 milligrams (mg) KOH per gram of polymer, and an acid number less than about 450, less than about 300 or less than about 100 mg KOH per gram of polymer. Preferably the base is a "fugitive" base that appreciably volatilizes out of the coating upon coating cure. Tertiary amines represent preferred bases. Exemplary tertiary amines include trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Triethyl amine and dimethyl ethanol amine are preferred tertiary amines.

Other water-dispersing groups that may be present in the copolymer or neutralized copolymer include anionic salt groups and cationic salt groups. Exemplary anionic salt groups include sulphate groups ($-OSO_3^-$), phosphate groups ($-OPO_3^-$), sulfonate groups ($-SO_2O^-$), phosphinate groups ($-POO^-$), phosphonate groups ($-PO_3^-$), and combinations thereof. Exemplary cationic salt groups include:

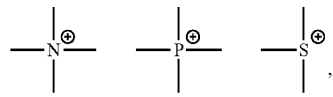

(referred to, respectively, as quaternary ammonium groups, quaternary phosphonium groups, and tertiary sulfate groups) and combinations thereof. Non-ionic water-dispersing groups including hydrophilic groups such as ethylene oxide groups may if desired be employed.

Compounds for introducing the aforementioned water-dispersing groups into the copolymer will be familiar to persons having ordinary skill in the art. Exemplary neutralizing bases other than amines for forming anionic salt groups include inorganic and organic bases such as sodium hydroxide, potassium hydroxide, lithium hydroxide, ammonium hydroxide, and mixtures thereof. Exemplary neutralizing compounds for forming cationic salt groups include organic and inorganic acids such as formic acid, acetic acid, hydrochloric acid, sulfuric acid, and combinations thereof.

The amount of salt employed for neutralizing an acid-functional or anhydride-functional copolymer preferably is no more than actually required, for example at least about 5 wt. %, at least about 10 wt. %, or at least about 15 wt. % of the neutralized copolymer weight, and in some embodiments up to about 95 wt. %, up to about 50 wt. %, or up to about 40 wt. % of the neutralized copolymer weight.

Coating compositions using the disclosed copolymers may be formulated using one or more optional curing agents (viz., crosslinking resins, sometimes referred to as "crosslinkers"). The resulting crosslinked copolymers represent a preferred subclass. The degree of crosslinking may be only partial, resulting in a copolymer that can be dispersed in an aqueous carrier, coated onto a substrate and coalesced to form a film, but which if dissolved in an organic solvent will form a gel that does not pass through a chromatography column for molecular weight measurement. The choice of a particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of mobile or bound BPA, BPF, BPS and epoxides thereof, for example bisphenol A diglycidyl ether ("BADGE"), bisphenol F diglycidyl ether ("BFDGE") and epoxy novalacs.

In some embodiments, the coating composition may be cured without the use of an external crosslinker (e.g., without phenolic crosslinkers). Additionally, the coating composition may be substantially free of formaldehyde and formaldehyde-containing compounds, essentially free of these compounds, essentially completely free of these compounds, or even completely free of these compounds.

A variety of hydroxyl-reactive curing resins (for example, phenoplast and aminoplast curing agents) may be used as crosslinkers. Exemplary phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol. Exemplary aminoplast resins include the condensation products of aldehydes such as formaldehyde, acetaldehyde, crotonaldehyde, and benzaldehyde with amino or amido group-containing substances such as urea, melamine, and benzoguanamine. Examples of other suitable crosslinking resins include, without limitation, benzoguanamine-formaldehyde resins, melamine-formaldehyde resins, etherified melamine-formaldehyde, and urea-formaldehyde resins.

Examples of other generally suitable curing agents include the blocked or non-blocked aliphatic, cycloaliphatic or aromatic di-, tri-, or polyvalent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates having a Mn of at least about 300, more preferably at least about 650, and even more preferably at least about 1,000 may be employed.

Polymeric blocked isocyanates are preferred in certain embodiments. Some examples of suitable polymeric blocked isocyanates include a biuret or isocyanurate of a diisocyanate, a trifunctional "trimer", or a mixture thereof. Examples of suitable blocked polymeric isocyanates include TRIXENE™ BI 7951, TRIXENE BI 7984, TRIXENE BI 7963 and TRIXENE BI 7981 (TRIXENE materials are available from Baxenden Chemicals, Ltd., Accrington, Lancashire, England), DESMODUR™ BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117 and DESMODUR VP LS 2352 (DESMODUR materials are available from Bayer Corp., Pittsburgh, PA, USA), or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

Examples of suitable blocking agents include malonates, such as ethyl malonate and diisopropyl malonate, acetylacetone, ethyl acetoacetate, 1-phenyl-3-methyl-5-pyrazolone, pyrazole, 3-methyl pyrazole, 3,5 dimethyl pyrazole, hydroxylamine, thiophenol, caprolactam, pyrocatechol, propyl mercaptan, N-methyl aniline, amines such as diphenyl amine and diisopropyl amine, phenol, 2,4-diisobutylphenol, methyl ethyl ketoxime, alpha-pyrrolidone, alcohols such as methanol, ethanol, butanol and t-butyl alcohol, ethylene imine, propylene imine, benzotriazoles such as benzotriazole, 5-methylbenzotriazole, 6-ethylbenzotriazole, 5-chlorobenzotriazole and 5-nitrobenzotriazole, methyl ethyl ketoxime (MEKO), diisopropylamine (DIPA), and combinations thereof.

The level of curing agent (viz., crosslinker) required will depend on the type of curing agent, the time and temperature of the bake, and the molecular weight and functionality of the copolymer. If used, the crosslinker is typically present in an amount of up to 15 wt. %, preferably up to 10 wt. %, and more preferably up to 5 wt. %. If used, the crosslinker is typically present in an amount of at least 0.1 wt. %, more preferably at least 0.5 wt. %, and even more preferably at least 1 wt. %. These weight percentages are based upon the total weight of resin solids in the coating composition.

In some embodiments, the disclosed coating composition includes, based on total resin solids, at least 0.1 wt. % of blocked polymeric isocyanates, more preferably from about 0.1 to about 0.5 wt. % of blocked polymeric isocyanates, and even more preferably from about 0.5 to about 10 wt. % of blocked polymeric isocyanates.

The disclosed coating composition may also include other optional polymers that do not adversely affect the coating composition or a cured coating composition resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect the coating composition or a cured coating composition resulting therefrom.

Such additional polymeric materials can be nonreactive, and hence, simply function as fillers. Such optional nonreactive filler polymers include, for example, latex polymers, polyesters, random acrylic copolymers, polyamides, polyethers, and novalacs. Alternatively, such additional polymeric materials or monomers can be reactive with other components of the composition. If desired, reactive polymers can be incorporated into the disclosed compositions, to provide additional functionality for various purposes, including crosslinking. Examples of such reactive polymers include, for example, appropriately-functionalized polymers based on latex polymers, random acrylic copolymers, polyesters, polyamides, and polyethers. Preferred optional polymers are substantially free of mobile and bound BPA, BPF and BPS, and preferably are also substantially free of aromatic glycidyl ether compounds (e.g., BADGE, BFDGE and epoxy novalacs).

The disclosed coating compositions may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom.

Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, surfactants, and mixtures thereof. Each optional ingredient is included in a sufficient amount to serve its intended purpose, but not in such an amount to adversely affect the coating composition or a cured coating composition resulting therefrom.

One preferred optional ingredient is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), trifluoromethanesulfonic acid (triflic acid), quaternary ammonium compounds, phosphorous compounds, and tin and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt. %, and more preferably at least 0.1 wt. %, based on the weight of nonvolatile material. If used, a catalyst is preferably present in an amount of no greater than 3 wt. %, and more preferably no greater than 1 wt. %, based on the weight of nonvolatile material.

Another useful optional ingredient is a lubricant (e.g., a wax), which facilitates manufacture of metal closures by imparting lubricity to sheets of coated metal substrate. Preferred lubricants include, for example, Carnauba wax and polyethylene type lubricants. If used, a lubricant is preferably present in the coating composition in an amount of at least 0.1 wt. %, and preferably no greater than 5 wt. %, and more preferably no greater than 2 wt. %, based on the weight of nonvolatile material.

Another useful optional ingredient is a pigment, such as titanium dioxide. If used, a pigment is present in the coating composition in an amount of no greater than 70 wt. %, more preferably no greater than 50 wt. %, and even more preferably no greater than 40 wt. %, based on the total weight of solids in the coating composition.

Surfactants can be optionally added to the coating composition (e.g., after the copolymer has already been formed) to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt. %, and more preferably at least 0.1 wt. %, based on the weight of resin solids. If used, a surfactant is preferably present in an amount no greater than 10 wt. %, and more preferably no greater than 5 wt. %, based on the weight of resin solids. Preferably however the use of surfactants is avoided, as they may contribute to water sensitivity, flavor alteration or flavor scalping.

The disclosed coating compositions preferably include water and may further include one or more optional organic solvents. Preferably, the coating composition includes at least about 30 wt. %, more preferably at least about 35 wt. %, and even more preferably at least about 40 wt. % of water, based on the weight of the coating composition. In some embodiments, the coating composition includes less than about 60 wt. %, more preferably less than about 50 wt. %, and even more preferably less than about 40 wt. % of water, based on the weight of the coating composition.

In certain embodiments, such as for example certain coil coating applications, the coating composition preferably includes one or more organic solvents. Exemplary solvents include alcohols such as methanol, ethanol, propyl alcohols (e.g., isopropanol), butyl alcohols (e.g., n-butanol) and pentyl alcohols (e.g., amyl alcohol); glycol ethers such as 2-butoxyethanol, ethylene glycol monomethyl ether (viz., butyl CELLOSOLVE™ from Dow Chemical Co.) and diethylene glycol monomethyl ether (viz., butyl CARBITOL™ from Dow Chemical Co.); ketones such as acetone and methyl ethyl ketone (MEK); N,N-dimethylformamides; carbonates such as ethylene carbonate and propylene carbonate; diglymes; N-methylpyrrolidone (NMP); acetates such as ethyl acetate, ethylene diacetate, propylene glycol monoacetate, propylene glycol diacetate and glycol ether acetates; alkyl ethers of ethylene; isophorones; aromatic solvents such as toluene and xylenes; and combinations thereof. Exemplary solvent amounts may for example be at least about 10 wt. %, more preferably at least about 25, and even more preferably at least about 30 wt. %, based on the weight of the coating composition. In some embodiments, the coating composition includes less than about 70 wt. %, more preferably less than about 60 wt. %, and even more preferably less than about 45 wt. % of organic solvent, based on the weight of the coating composition. While not intending to be bound by any theory, the inclusion of a suitable amount of organic solvent is advantageous for certain coil coating applications to modify flow and leveling of the coating composition, control blistering, and maximize the line speed of the coil coater. Moreover, vapors generated from evaporation of the organic solvent during cure of the coating may be used to fuel the curing ovens.

In some embodiments, such as for certain coil coating applications, the coating composition may have a total solids content greater than about 10 wt. %, more preferably greater than about 15 wt. %, and even more preferably greater than about 20 wt. %, based on the total weight of the coating composition. In these embodiments, the coating composition may also have a total solids weight less than about 50 wt. %, more preferably less than about 45 wt. %, and even more preferably less than about 40 wt. %, based on the total weight of the coating composition. In some of these embodiments, the coating composition may have a total solids weight ranging from about 25 wt. % to about 45 wt. %. The carrier (which preferably is an aqueous carrier that includes at least some organic solvent) may constitute the remainder of the weight of the coating composition.

Embodiments of the disclosed coating composition may for example contain at least about 20, at least about 25 or at least about 30 wt. % and up to about 50, up to about 45 or up to about 40 wt. % of the copolymer; at least about 20, at least about 25 or at least about 30 wt. % and up to about 50, up to about 45 or up to about 40 wt. % water, and at least about 20, at least about 25 or at least about 30 wt. % and up to about 50, up to about 45 or up to about 40 wt. % organic solvent.

The coating composition preferably has a viscosity suitable for a given coating application. In some embodiments, the coating composition may have an average viscosity greater than about 20 seconds, more preferably greater than 25 seconds, and even more preferably greater than about 40 seconds, based on the Viscosity Test described below (Ford Viscosity Cup #2 at 25° C.). In some embodiments, the coating composition may also have an average viscosity less than about 100 seconds, more preferably less than 90 seconds, and even more preferably less than about 80 seconds, when performed pursuant to ASTM D1200-88 using a Ford Viscosity Cup #2 at 25° C.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, and typically are applied, using the mixed units commonly employed in the packaging industry, at coating weights of about 1 to about 20 mg/in$^2$ (msi) and more typically at about 1.5 to about 10 msi. Typically, the coating weight for rigid metal food or beverage can applications will be about 1 to about 8 msi. In certain embodiments in which the coating composition is used as an interior coating on a drum (e.g., a drum for use with food or beverage products), the coating weight may be approximately 20 msi.

The metal substrate used in forming rigid food or beverage cans, or portions thereof, typically has a thickness in the range of about 125 micrometers to about 635 micrometers. Electro tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, two-piece or three-piece cans or portions thereof such as riveted beverage can ends (e.g., soda or beer cans) with a cured coating of the disclosed coating composition on a surface thereof can be formed in such a method. In another embodiment, a method of forming food or beverage cans is provided that includes: providing a packaging container or a portion thereof (e.g., a food or beverage can or a portion thereof), applying a coating composition described herein to the inside, outside or both inside and outside portions of such packaging container or a portion thereof (e.g., via spray application, dipping, etc.), and hardening the composition.

As described above, the disclosed coating compositions are particularly well adapted for use on food and beverage cans (e.g., two-piece cans, three-piece cans, etc.). Two-piece cans are manufactured by joining a can body (typically a drawn metal body) with a can end (typically a drawn metal end). The disclosed coatings are suitable for use in food or beverage contact situations and may be used on the inside of such cans. They are particularly suitable for spray applied, liquid coatings for the interior of two-piece drawn and ironed beverage cans and coil coatings for beverage can ends. The disclosed coating compositions also offer utility in other applications. These additional applications include, but are not limited to, wash coating, sheet coating, and side seam coatings (e.g., food can side seam coatings). The coating composition may also be useful in medical packaging applications, including, for example, on surfaces of metered-dose inhalers ("MDIs"), including on drug-contact surfaces.

Spray coating includes the introduction via spraying of the coated composition onto a surface, e.g., into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove the residual solvents and harden the coating.

A coil coating is described as the coating of a continuous coil composed of a metal (e.g., steel or aluminum). Once coated, the coating coil is subjected to a short thermal, ultraviolet or electromagnetic curing cycle, for hardening (e.g., drying and curing) of the coating. Coil coatings provide coated metal (e.g., steel or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet or electromagnetic curing oven to harden (e.g., dry and cure) the coating. The residence time of the coated can within the confines of the curing oven is typically from 1 minute to 5 minutes. The curing temperature within this oven will typically range from 150 to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrates that can be successfully fabricated into formed articles, such as two-piece drawn food cans, three-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed "weld" from subsequent corrosion or other effects of the contained foodstuff. The liquid coatings that function in this role are termed "side seam stripes." Typical side seam stripes are spray applied and cured quickly via residual heat from the welding operation in addition to a small thermal, ultraviolet, or electromagnetic oven.

For any of the application techniques described above, the curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step. The cure conditions will vary depending upon the method of application and the intended end use. The curing process may be performed at any suitable temperature, including, for example, oven temperatures in the range of from about 100° C. to about 300° C., and more typically from about 177° C. to about 250° C. If the substrate to be coated is a metal coil, curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

Other commercial coating application and curing methods are also envisioned, for example, electrocoating, extrusion coating, laminating, powder coating, and the like.

Preferred coating compositions display one or more of the properties described in the Examples Section. More preferred coating compositions display one or more of the following properties: metal exposure value of less than 1 mA; metal exposure value after drop damage of less than 1.5 mA; global extraction results of less than 50 ppm; less than about 50%, preferably less than about 30% and more preferably less than about 10% aldehyde loss when evaluated for flavor scalping (and more preferably less than about 50%, less than about 30% or less than about 10% of the aldehyde loss exhibited by currently employed coatings for aluminum cans containing carbonated colas); adhesion rating of 10; blush rating of at least 7; slight or no crazing in a reverse impact test; no craze (rating of 10) in a dome impact test; feathering below 0.035; COF range of 0.040 to 0.1; an initial end continuity of less than 10 mA (more preferably less than 5, 2, or 1 mA); and after pasteurization or retort, a continuity of less than 20 mA.

The disclosed compositions and coated containers may be evaluated using a variety of tests including those discussed below.

Initial Metal Exposure for can Body

This test method determines the amount of the inside surface of the can that has not been effectively coated by the sprayed coating. This determination is made through the use of an electrically conductive salt solution containing 1 wt. % NaCl in room temperature deionized water. The can is coated at a 100 to 130 mg/can coating weight, filled with the conductive solution, and an electrical probe is attached in contact with the outside of the can (uncoated, electrically conducting). A second probe is immersed in the conductive solution in the middle of the inside of the can. If any uncoated metal is present on the inside of the can, a current will pass between these two probes and register as a value in milliamps (mA) on an LED display. The current is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 1.0 mA on average.

Metal Exposure after Drop Damage

Drop damage resistance measures the ability of the coated container to resist cracks after being in conditions simulating dropping a filled can. The presence of cracks is measured by passing electrical current via an electrolyte solution, as previously described in the Initial Metal Exposure section. A coated container is filled with the electrolyte solution and the Initial Metal Exposure current is recorded. The can is then filled with water and dropped through a tube from a height of 61 cm onto a 33° inclined plane, causing a dent in the chime area. The can is then turned 180 degrees, and the process is repeated. Water is then removed from the can and metal exposure current is again measured as described above. If there is no damage, no change in current (mA) will be observed. Typically, an average of 6 or 12 container runs is recorded. Metal exposure current results both before and after the drop are reported. The lower the milliamp value, the better the resistance of the coating to drop damage. Preferred coatings give metal exposure values after drop damage of less than 3.5 mA, more preferred valued of less than 2.5 mA, and even more preferred values of less than 1.5 mA.

Solvent Resistance

The extent of "cure" or crosslinking of a coating is measured as a resistance to solvents, such as methyl ethyl ketone (MEK, available from Exxon, Newark, NJ) or isopropyl alcohol (IPA). This test is performed as described in ASTM D 5402-93. The number of double-rubs (viz., one back-and forth motion) is reported.

Global Extraction

The global extraction test is designed to estimate the total amount of mobile material that can potentially migrate out of a coating and into food packed in a coated can. Typically a coated substrate is subjected to water or solvent blends under a variety of conditions to simulate a given end use. Acceptable extraction conditions and media can be found in 21CFR 175.300 paragraphs (d) and (e). The allowable global extraction limit as defined by this FDA regulation is 50 parts per million (ppm).

The extraction procedure is described in 21CFR 175.300 paragraph (e)(4)(xv) with the following modifications to ensure worst-case scenario performance: 1) the alcohol content is increased to 10% by weight and 2) the filled containers are held for a 10-day equilibrium period at 38° C. (100° F.). These conditions are per the FDA publication "Guidelines for Industry" for preparation of Food Contact Notifications. The coated beverage can is filled with 10 weight percent aqueous ethanol and subjected to pasteurization conditions (66° C., 150° F.) for 2 hours, followed by a 10-day equilibrium period at 38° C. (100° F.). Determination of the amount of extractives is determined as described in 21CFR 175.300 paragraph (e)(5), and ppm values are calculated based on surface area of the can (no end) of 44 square inches with a volume of 355 ml. Preferred coatings give global extraction results of less than 50 ppm, more preferred results of less than 10 ppm, and even more preferred results of less than 1 ppm. Most preferably, the global extraction results are non-detectable.

Flavor Scalping

A solution containing 250 parts per billion (ppb) of three different aldehydes at pH 3 is prepared as follows. First, an intermediate aldehyde stock solution (about 10,000 ppm) is prepared by diluting known amounts of the aldehydes octanal, nonanal and decanal in pure (190 proof) ethanol. Next, water acidified to pH 3 is prepared by adding approximately 600 µl of 75% phosphoric acid into 4 liters of deionized (DI) water, while using pH paper to ensure the pH is about pH 3. The pH is adjusted using more phosphoric acid or DI water to a final pH of from about 2.5 to about 3. A known amount of stock aldehyde solution is added into the acidified water with a dilution factor of about 40,000, to obtain a final concentration of about 250 ppb of each of the three aldehydes in a final volume of 4 L.

Cured coatings are applied to 16.8 cm by 16.8 cm square metal panels and cured in an oven at a 204° C. set point for 75 seconds to provide dry films with coating weights of about 1.9 msi. These panels are inserted into an FDA-specified single-sided extraction cells made according to the design found in the *Journal of the Association of Official Analytical Chemists*, 47(2):387 (1964), with minor modifications. The cell is 22.9 cm×22.9 cm×1.3 cm (9 in ×9 in ×0.5 in) with a 15.2 cm×15.2 cm (6 in ×6 in) open area in the center of a TEFLON™ (DuPont) polytetrafluoroethylene spacer. This allows for exposure of 232 $cm^2$ (36 $in^2$) or 465 $cm^2$ (72 $in^2$) of the test panel to the aldehyde solution. The cell holds 300 mL of aldehyde simulating solvent. The ratio of solvent to surface area is 1.29 $mL/cm^2$ or 0.65 $mL/cm^2$ when 232 $cm^2$ (36 $in^2$) or 465 $cm^2$ (72 $in^2$) of the test article are exposed to the solution. The extraction cells are filled with the above-described solution containing 250 ppb of each aldehyde and maintained at 40° C. for 3 days.

A gas chromatograph (GC) and the headspace solid-phase microextraction (HS-SPME) method are used to evaluate flavor scalping performance. The GC injection port is equipped with a 0.75 mm i.d. SUPELCO™ (Sigma-Aldrich) liner to minimize peak broadening. For the headspace analysis, the injection is performed in the splitless mode for 0.8 min at 250° C., and then split (1:55) after 0.8 minutes. The oven temperature is programmed at 40° C. isothermally for 5 min, then ramped to 220° C. at 10° C./min and held for 1 min at the final temperature. Helium is used as the carrier gas with a flow-rate of 1.5 mL/min. The injector and detector temperatures are 250° C. and 270° C., respectively. The amounts of each aldehyde lost from the test solution during storage is measured and reported as a percent of the original concentration. Flavor Scalping is reported as the % aldehyde lost relative to a current industry standard coating formulation.

Adhesion

Adhesion testing is performed to assess whether the coating adheres to the coated substrate. The adhesion test is performed according to ASTM D 3359-Test Method B, using SCOTCH™ 610 tape, available from 3M. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilization or Pasteurization test. Testing is accomplished by subjecting the substrate to heat ranging from 105-130° C. and pressure ranging from 0.7 to 1.05 $kg/cm^2$ for a period of 15 to 90 minutes. The coated substrate is immersed in DI water and subjected to heat of 121° C. (250° F.) and pressure of 1.05 $kg/cm^2$ for a period of 90 minutes. The coated substrate is then tested for adhesion and blush as described above. In food or beverage applications requiring retort performance, adhesion ratings of 10 and blush ratings of at least 7 are typically desired for commercially viable coatings.

Necking Test

This test measures the flexibility and adhesion of the film following a commercial necking process. Necking is done to facilitate the application of a container end that allows sealing the container. The test involves applying the coating to the container at a recommended film thickness and subjecting the container to a recommended bake. Prior to the necking process, sample cans typically will have a metal exposure value of <1.0 mA (average of 12 cans) when evaluated using an electrolyte solution as described above. After the necking process, cans should display no increase in metal exposure compared to the average for 12 non-necked cans. Elevated mA values indicate a fracture in the film which constitutes film failure.

Reforming/Reprofiling Test

This test measures the flexibility and adhesion of the film following the commercial reforming process. Reforming or reprofiling are done to strengthen the can. The test involves applying the coating to the container at a recommended film thickness and subjecting the container to a recommended bake. Prior to the reforming process, sample cans typically will have a metal exposure value of <1.0 mA (average of 12 cans) when evaluated using an electrolyte solution as described above. After the reforming process, cans should display no increase in metal exposure compared to the average for 12 non-reformed cans. Elevated mA values indicate a fracture in the film which constitutes film failure.
Boiling Water Test This test simulates the water resistance of the film. The coating is applied to an appropriate substrate at a targeted film thickness and bake cycle. DI water is heated in a container to boiling (100° C.). Test cans or panels are placed in the boiling water. After 10 minutes, the test can or panel is removed, rinsed with water and dried. The coating is then crosshatched. A section of 25 mm (1 in.) long SCOTCH No. 610 tape is applied to the crosshatched area and immediately removed in a quick motion pulling perpendicular to the panel. The samples are then evaluated for adhesion and blush, as previously described. Beverage interior coatings preferably give adhesion ratings of 10 and blush ratings of at least 7, preferably at least 9 and optimally 10.
Boiling Acetic Acid Test This test simulates the resistance of the film when exposed to acidic media, and is performed and evaluated as in the Boiling Water test but using a blend of 3 wt. % acetic acid and 97 wt. % DI water heated to 100° C. and a 30 minute immersion time. Beverage interior coatings preferably give adhesion ratings of 10 and blush ratings of at least 7 and optimally at least 9.
Citric Acid Test This test simulates the resistance of the film to a 2% citric acid solution exposed to a 30 minute, 121° C. retort condition. The coating is applied to an appropriate substrate at a targeted film thickness and bake cycle. Test cans or panels are placed inside a retort container containing the 2% citric acid solution. The solution is heated in the retort vessel to 121° C. After 30 minutes, the test can or panel is removed, rinsed with water and dried. The coating is then crosshatched and evaluated for adhesion and blush as in the Boiling Water test. Beverage interior coatings preferably give adhesion ratings of 10 and blush ratings of at least 7 and optimally at least 9.
Flavor-Water Test This test simulates the potential for off flavor imparted from the coating. A trained flavor panel is required for best results with this test. Sample cans or panels are subjected to recommended film thickness and bake conditions. Cans are rinsed, filled with DI water, covered with aluminum foil and then immersed in a water bath at 63° C. Once the water inside the cans has reached 63° C., they are held at that temperature for 30 minutes. After 30 minutes, the cans are removed and allowed to cool overnight. The water from the cans is then provided to the flavor panel for testing. A blank, composed of water only is used as the control.
Glass Transition Temperature Samples for DSC testing may be prepared by first applying the liquid resin composition onto aluminum sheet panels. The panels are then baked in a Fisher ISOTEMP™ electric oven for 20 minutes at 149° C. (300° F.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transition values are calculated from the thermogram of the last heat cycle. The glass transition is measured at the inflection point of the transition. When multiple transitions are observed, multiple glass transition temperatures are recorded.

EXAMPLES

The following examples are offered to aid in understanding of the present invention and are not to be construed as limiting the scope thereof. Unless otherwise indicated, all parts and percentages are by weight.

Example 1

Block Copolymer Preparation

Preparation of a block copolymer of 36 wt. % (50 mol. %) acrylic acid and 64 wt. % (50 mol. %) n-butyl acrylate. 788.6 Parts DI water were added to a reaction vessel equipped with a thermocouple, reflux capabilities, nitrogen blanketing capabilities, and propeller blade. The water was sparged with nitrogen for 60 minutes and the system was set to total reflux. Once sparged, the sparging tube was removed, the nitrogen blanket was started and agitation was set to 400-600 rpm. 71.1 Parts acrylic acid were added to the deionized water and the temperature was set to 75° C. In a temperature range of 70°-75° C., 135.3 parts n-butyl acrylate were added and allowed to mix for 10 minutes. Following the 10 minute mixing period, a premix of 3.70 parts 2,2'-azobis(2-methylpropionamidine) dihydrochloride initiator and 48 parts deionized water was added over 180 minutes. Once the initiator feed was complete, an additional 0.37 parts 2,2'-azobis(2-methylpropionamidine) dihydrochloride and 4.8 parts deionized water was added and the temperature was held for 120 minutes followed by cooling. The resulting copolymer resin had an A-B block structure with a "soft" block having a Tg of −28° C. and a "hard" block having a Tg of 111° C., contained about 20 wt. % non-volatile materials, and had a theoretical acid number of 56.1.

The resin was dried and extracted with tetrahydrofuran (THF) and chloroform. The dried and THF-extracted samples continued to exhibit two Tg values. The chloroform extract appeared to contain only the soft block.

Example 2

Block Copolymer Preparation

Preparation of a block copolymer of 36 wt. % (50 mol. %) acrylic acid and 64 wt. % (50 mol. %) n-butyl acrylate with amine stabilization. Using the method of Example 1, 748.1 parts DI water were added to the reaction vessel. The water was sparged with nitrogen for 60 minutes and the system was set to total reflux. Once sparged, the sparging tube was removed, the nitrogen blanket was started and agitation was set to 400-600 rpm. 76.11 Parts acrylic acid were added to the deionized water and the temperature was set to 75° C. In a temperature range of 70°-75° C., 135.26 parts n-butyl acrylate were added and allowed to mix for 10 minutes. Following the 10 mixing period, a premix of 3.70 parts 2,2'-azobis(2-methylpropionamidine) dihydrochloride initiator and 48 parts deionized water was added over 180 minutes. Once the initiator feed was complete, an additional 0.37 parts 2,2'-azobis(2-methylpropionamidine) dihydrochloride and 4.8 parts deionized water was added and the temperature was held for 120 minutes. The resulting copolymer dispersion was stabilized by adding 9.4 parts dimethyl ethanolamine and mixing for 20 minutes followed by cooling. The resulting copolymer resin had an A-B block structure with a "soft" block having a Tg of −29° C. and a "hard" block having a Tg of 103° C. The liquid resin had a viscosity of 94 cps at 27° C. and contained 19.3 wt. % nonvolatile materials (NVM).

Figure 6:
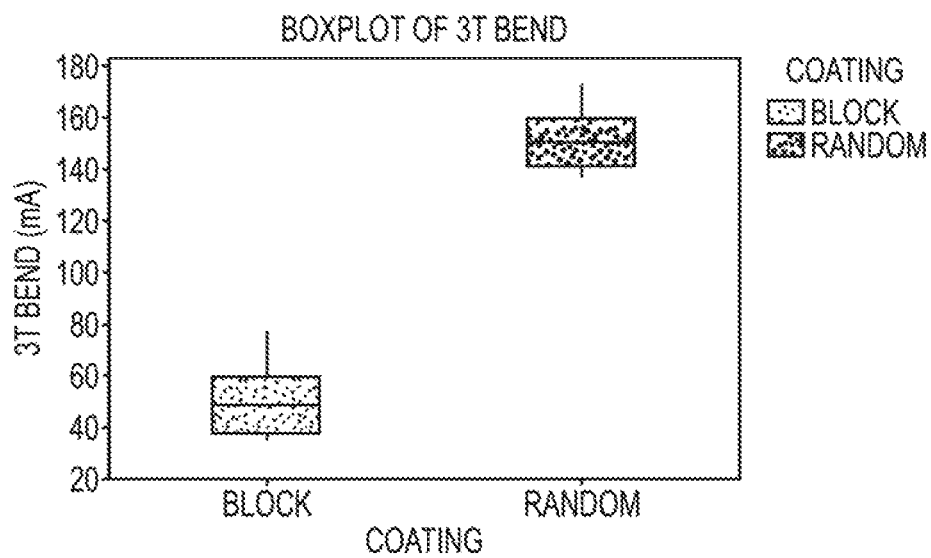
FIG. 6 is a graph showing 3T Bend performance for the disclosed acrylic block copolymer compared to a random copolymer.

The copolymer resin was diluted with n-butanol to form a solution containing 15.2 wt. % NVM in 75:25 water:n-butanol. The solution was applied to a steel coil substrate at a 7 mg/in$^2$ (msi) coating weight and cured in an oven for 1 minute at 232° C. The cured substrate was subjected to a 3T bend and evaluated using the Initial Metal Exposure test to determine current passage through the coating inside the bend. Values of 40-50 mA were obtained and are shown in FIG. 6.

Comparison Example 1

Random Copolymer Preparation

Preparation of a statistical (viz., random) copolymer of 36 wt. % (50 mol. %) acrylic acid and 64 wt. % (50 mol. %) n-butyl acrylate. 737.4 Parts n-butanol and 36.9 parts DI water were added to the Example 1 reaction vessel. The n-butanol solution was sparged with nitrogen for 60 minutes and the system was set to total reflux. Once sparged, the sparging tube was removed, the nitrogen blanket was started and agitation was set to 250 rpm. 74.7 Parts acrylic acid were added to the n-butanol solution and the temperature was set to 75° C. In a temperature range of 70°-75° C., 135.3 parts n-butyl acrylate were added and allowed to mix for 10 minutes. Following the 10 minute mixing period, a premix of 2.2 parts LUPEROX™ 26 t-butylperoxy 2-ethylhexanoate initiator (Arkema, Inc.) and 48 parts n-butanol was added over 180 minutes. 30 Minutes into the feed, the set temperature was increased to 96° C. Once the initiator feed was complete, an additional 0.22 parts LUPEROX 26 and 4.8 parts n-butanol was added and the temperature was held for 120 minutes followed by cooling. The resulting random copolymer resin had a single Tg of −21° C., an acid number of 263, a viscosity of 29 cps at 27° C. and contained 18.8 wt. % NVM.

The resin solution was applied to a steel coil substrate at a 7 mg/in$^2$ (msi) coating weight and cured in an oven for 1 minute at 232° C. Using the method of Example 2, the cured substrate was subjected to a 3T bend and evaluated using the Initial Metal Exposure test to determine current passage through the coating inside the bend. Values of 140-160 mA were obtained and are shown in FIG. 6. The current passage results for Example 2 and Comparison Example 1 show that the disclosed block copolymer provided much better coating integrity after bending than did a random copolymer made from the same monomers.

The complete disclosures of the patents, patent documents, and publications cited herein are incorporated by reference in their entirety as if each were individually incorporated. Various modifications and alterations to this invention will become apparent to those skilled in the art without departing from this invention. It should be understood that this invention is not intended to be unduly limited by the illustrative embodiments and examples set forth herein and that such examples and embodiments are presented by way of example only, with the scope of the invention intended to be limited only by the claims set forth below.

What is claimed is:

1. A food or beverage container that includes one or more of a body portion or an end portion including a metal substrate and a cured coating disposed thereon as a cured continuous coating on an interior surface at a coating weight of about 1 to about 20 mg/in$^2$ (msi), wherein the coating is formed from an aqueous coating composition comprising a water-dispersible acrylic linear block copolymer made by surfactant-free heterogeneous radical polymerization, wherein the copolymer has blocks having different glass transition temperatures (Tg) by at least about 50° C., and the copolymer has a number average molecular weight (Mn) of at least 75,000 Daltons and an acid number of at least 80 milligrams (mg) KOH per gram of copolymer.

2. The food or beverage container of claim 1, wherein the copolymer has a number average molecular weight of less than 1,000,000 Daltons.

3. The food or beverage container of claim 1, wherein the copolymer has an acid number of less than about 450 milligrams (mg) KOH per gram of copolymer.

4. The food or beverage container of claim 1, wherein the copolymer has an acid number less than about 300 milligrams (mg) KOH per gram of copolymer.

5. The food or beverage container of claim 1, wherein the coating composition is substantially free of any structural units derived from a bisphenol.

6. The food or beverage container of claim 1, wherein the copolymer has an A-B diblock structure in which the A block is derived from a water-soluble monomer, the B block is entirely derived from a less water-soluble or water-insoluble monomer, and the A block has a lower Tg than the B block.

7. The food or beverage container of claim 1, wherein the copolymer has a B-A-B triblock structure in which the A block is derived from a water-soluble monomer, the B blocks are derived from a less water-soluble or water-insoluble monomer, and the A block has a lower Tg than the B blocks.

8. The food or beverage container of claim 6, wherein the A block and B block(s) differ in Tg by at least about 20° C.

9. The food or beverage container of claim 8, wherein the A block and B block(s) differ in Tg by at least about 50° C.

10. The food or beverage container of claim 9, wherein the A block and B block(s) differ in Tg by at least about 100° C.

11. The food or beverage container of claim 6, wherein the copolymer contains about 25 to about 75 mole percent of the A block and about 75 to about 25 mole percent of the B block(s).

12. The food or beverage container of claim 1, wherein each block includes at least 5 units derived from or derivable from a monomer.

13. The food or beverage container of claim 1, wherein each block includes at least 10 units derived from or derivable from a monomer.

14. The food or beverage container of claim 1, wherein the coating composition is present on a food-contact surface of the metal substrate.

15. The food or beverage container of claim 1, wherein the metal substrate is a two-piece drawn and ironed aluminum can having the coating composition disposed thereon as a cured continuous coating on an interior surface sprayed on such surface at a coating weight of about 1 to about 20 mg/in$^2$ (msi), and wherein a block of the copolymer has Tg of at least 100° C.

16. The food or beverage container of claim 1, which is a food or beverage can that contains a food or beverage product.

17. A method for preparing a coated food or beverage container, or a portion thereof, the method including applying an aqueous coating composition as a cured continuous coating on an interior surface at a coating weight of about 1 to about 20 mg/in$^2$ (msi) that includes a water-dispersible acrylic linear block copolymer made by surfactant-free heterogeneous radical polymerization to a metal substrate prior to or after forming the metal substrate into a food or beverage container or portion thereof, wherein the copolymer has blocks having different glass transition temperatures (Tg) by at least about 50° C., and the copolymer has a number average molecular weight (Mn) of at least 75,000 Daltons and an acid number of at least 80 milligrams (mg) KOH per gram of copolymer.

18. The method of claim 17, wherein applying the composition to such metal substrate includes applying the composition to a metal substrate in the form of a planar coil or sheet, hardening the composition, and forming the substrate into a food or beverage can or portions thereof.

19. The method of claim 17, wherein applying the composition to such metal substrate comprises applying the composition to the metal substrate after the metal substrate has been formed into a can or portion thereof.

20. The method of claim 19, wherein the coating composition is applied by spraying the coating composition onto the metal substrate.

* * * * *